Aug. 3, 1926.

A. KÉGRESSE

DUST CAP

Filed August 22, 1922

1,594,838

INVENTOR:
Adolphe Kégresse
BY
ATTORNEY

Patented Aug. 3, 1926.

1,594,838

UNITED STATES PATENT OFFICE.

ADOLPHE KÉGRESSE, OF PARIS, FRANCE.

DUST CAP.

Application filed August 22, 1922, Serial No. 583,610, and in Germany August 29, 1921.

At present, in order to protect, for example, roller bearings, chiefly in automobile construction, felts or such like materials are used, arranged in suitably formed grooves or cages. Closure is obtained by friction of the belt or such like on a revolving metal part.

The object of my invention is to provide an improved dust cap comprising a system of rigid baffles, intended to suppress frictions on parts of the machine itself and combining in a compact unit the elements required to ensure efficient protection of the parts to be shielded against introduction of foreign matters, water, dust, etc.

Figure 3:
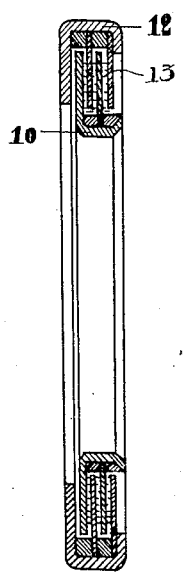
Figure 4:
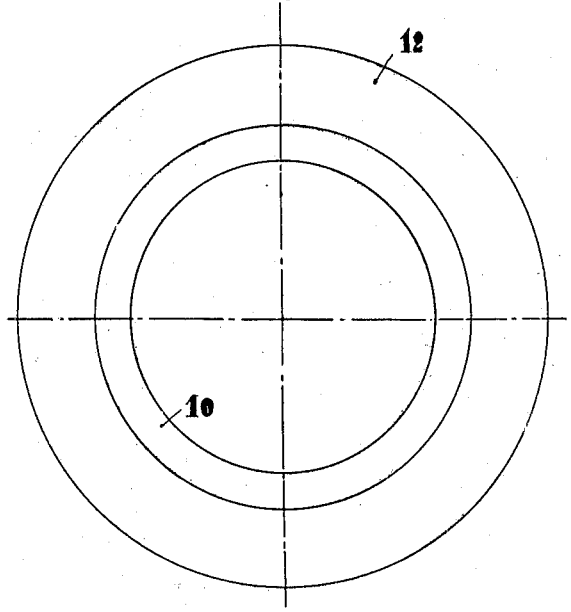
Figure 1:
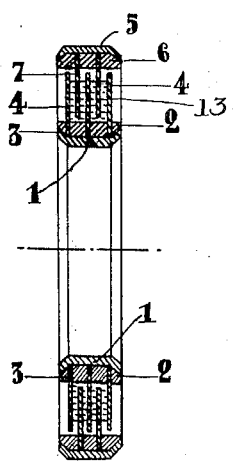
Figure 2:
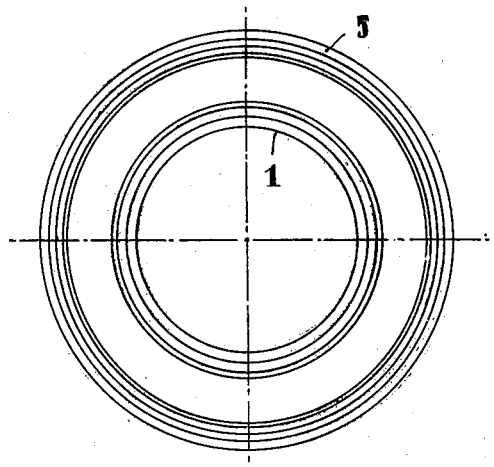

So as to make my invention more clearly understood, I have appended hereto a drawing illustrating, by way of example, an embodiment thereof and wherein:—
Figure 1 is a section of my device.
Figure 2 is a front view thereof.
Figure 3 and Figure 4 relate to a modification.

The device comprises inner and outer rings or cages 1 and 5 of concavo-convex section disposed in spaced, concentric relation with their concave faces confronting each other and, preferably, of opposite curvature. Each cage carries a set of flat, circular baffle plates or disks, as indicated at 4 and 7; the two sets interfitting and extending past each other in opposite directions, and being secured to the concave faces of the corresponding cages, in the manner subsequently explained, by means of the supporting and spacing rings 2 and 3, in the case of the baffles 4, and similar rings 6 in the case of the baffles 7. The latter have an inner diameter which is slightly greater than the outer diameter of the combined supports and spacers 2 and 3, while the baffles 4 have an outer diameter which is slightly less than the inner diameter of the combined supports and spacers 6; due to which construction the baffles 7 will terminate short of the parts 2 and 3, and the baffles 4 will terminate short of the parts 6, the provision of the parts 2, 3 and 6 effecting the disposition of adjacent baffles in laterally-spaced relation, as will be understood.

The spaces just referred to are designed to receive filling material 13 of some character. Preferably, this material consists of a suitable grease which is caused to penetrate into and to fill said spaces by plunging the two sets of baffles into a hot bath of the grease, this operation being effected after the parts have been assembled. The grease, however, may be replaced by thin strips of felt or fiber which are arranged in place during the course of assembling the baffles and which are left perfectly free or floating in the spaces referred to. In either case, the filling material, whether semi-plastic or in strip form, will obstruct the passage of dust through the labyrinthine passage created by the baffles and, hence, will prevent it from reaching the ball-bearing to be protected.

In assembling the parts, one of the baffles— for instance, the right-hand baffle 4 in Fig. 1—is fitted at its inner edge with the spacing and supporting rings 2, which, in the embodiment illustrated, are disposed against its opposite faces. The right-hand baffle 7 is next fitted with its rings 6 and arranged against the first-mentioned parts in such a way that the outer ring 6 extends past the outer edge of the baffle 4, while the inner ring 2 extends past the inner edge of the baffle 7, as will be apparent from Fig. 1. The next part to be positioned is the middle baffle 4 which has previously been fitted with its ring 3, and thereafter the second or left-hand baffle 7 is positioned; the building-up being continued part by part until all of the baffles in both sets have been assembled, whereupon all of the parts are secured together by soldering. Finally, the inner cage 1 is put in place and secured to the rings 2 and 3 by soldering, and the outer cage 5 is arranged against and soldered to the rings 6. The number of baffles and rings may obviously vary within wide limits, and the precise order in which the soldering operation or operations may take place is immaterial. The rings 2, 3 and 6 may, for example, be separate from the associated baffles when first positioned, and may be soldered immediately after being positioned, or all of them may be soldered after the building-up has been completed.

The cage 5, with its connected baffles 7 may be secured to the stationary member of the ball-bearing, and the cage 1 and its baffles 4 may be secured to the rotating member, and vice versa. In any event, it will be understood that the several parts above specified conjointly form a single compact unit of true annular construction, which can be readily applied bodily as such directly to the ball-bearing to be protected and disposed, like a simple washer, directly against one side of the bearing; and that it can with equal facility be removed bodily as a unit when necessary or desired. In this respect the device is clearly distinguished from devices of the same general character, as heretofore constructed, which usually had to be applied to, and removed from, the bearing to be protected, element by element, so that much time was required for either operation.

The construction described above may be somewhat modified and simplified, while still retaining all of the essential features, as will be apparent from Figs. 3 and 4, which show the preferred form of the invention, as actually carried into practice. As indicated in these two figures, the number of baffles may be reduced and the cages formed at one side with lateral cheeks which overlap in the same way as the baffles and which, therefore, act as such. The cages are indicated therein at 10 and 12; the cheek portions or extensions being located on the inner (left-hand) edge of the inner cage 10 and on the adjacent edge of the outer cage 12, both cages comprising concavo-convex body portions which confront each other, as before. The manner of assembling and connecting the parts is the same as that already described.

I claim as my invention:—

1. A dust cap for protecting ball-bearings; consisting of a single compact annular unit which is adapted to be disposed directly against one face of the bearing to be protected to prevent access of dust thereto, and which is mountable and demountable bodily as a unit; such unit comprising coordinate outer and inner members having concentric annular body portions of concavo-convex section which are arranged in spaced relation with their concave faces confronting each other, combined supporting and spacing rings secured to the concave face of each member, and a set of flat, circular baffles individual to each member and to which said rings are secured at their side edges, the two sets of baffles interfitting and extending freely past each other in opposite directions.

2. A dust cap for protecting ball-bearings, consisting of a single compact annular unit which is adapted to be disposed directly against one face of the bearing to be protected to prevent access of dust thereto, and which is mountable and demountable bodily as a unit; such unit comprising coordinate outer and inner members having concentric, annular body portions, the confronting inner faces of which are spaced from each other, and circular baffle plates secured to the body portions of said members and extending freely past one another in opposite directions, the outer member having one of its edges extended continuously inward to form a flat, circular cheek, and the inner member having that edge thereof which is adjacent such cheek extended continuously outward to form a second flat, circular cheek arranged parallel with and overlapping the inner face of the first cheek.

In testimony whereof I affix my signature.

ADOLPHE KÉGRESSE.